(12) United States Patent
Eberst

(10) Patent No.: US 7,090,287 B1
(45) Date of Patent: Aug. 15, 2006

(54) STREAMLINER WIND DEFLECTOR FOR PICKUP TRUCK

(76) Inventor: John Eberst, 25 Forest St., Exeter, NH (US) 03833

( * ) Notice: Subject to any disclaimer, the term of this patent is extended or adjusted under 35 U.S.C. 154(b) by 0 days.

(21) Appl. No.: 11/294,933

(22) Filed: Dec. 6, 2005

(51) Int. Cl.
 *B62D 35/00* (2006.01)
(52) U.S. Cl. .................. 296/180.1; 296/37.6
(58) Field of Classification Search .......... 296/37.6, 296/180.1, 180.2, 180.3, 180.5
See application file for complete search history.

(56) References Cited

U.S. PATENT DOCUMENTS

| | | | |
|---|---|---|---|
| 4,451,075 A * | 5/1984 | Canfield | 296/37.6 |
| 4,506,870 A | 3/1985 | Penn | 296/1 S |
| 4,863,213 A * | 9/1989 | Deaver et al. | 296/180.1 |
| 4,884,838 A * | 12/1989 | Slater | 296/180.1 |
| 4,938,398 A | 7/1990 | Hallsen | 224/42.42 |
| 5,069,498 A * | 12/1991 | Benchoff | 296/180.1 |
| 5,083,829 A | 1/1992 | Fonseca | 296/37.6 |
| 5,232,259 A | 8/1993 | Booker | 296/37.6 |
| 5,435,616 A | 7/1995 | Corner | 296/180.1 |
| 5,498,049 A * | 3/1996 | Schlachter | 296/37.6 |
| 5,498,058 A | 3/1996 | Kuo | 296/180.1 |
| 5,551,747 A | 9/1996 | Larsen | 296/180.1 |
| 5,688,020 A | 11/1997 | Burg | 296/180.1 |
| 5,722,714 A * | 3/1998 | Vallerand | 296/180.1 |
| 5,735,567 A * | 4/1998 | Mora, Sr. | 296/180.1 |
| 5,743,589 A * | 4/1998 | Felker | 296/180.5 |
| D410,427 S * | 6/1999 | Kokones | D12/400 |
| 6,325,448 B1 * | 12/2001 | Estrada et al. | 296/180.1 |
| 6,517,140 B1 | 2/2003 | Wilde | 296/130.1 |
| 6,712,423 B1 * | 3/2004 | Lehmann | 296/180.1 |
| 2002/0167196 A1 * | 11/2002 | Huang | 296/180.5 |
| 2006/0043769 A1 * | 3/2006 | Lehmann | 296/180.1 |

* cited by examiner

*Primary Examiner*—Jason Morrow
(74) *Attorney, Agent, or Firm*—Bernhard P. Molldrem, Jr.

(57) ABSTRACT

A wind deflector for a pickup truck or a similar vehicle, is formed with a frame that includes left and right side members for removably attaching to structure in the truck. A rigid wind deflector panel is supported on the frame and extends diagonally up and back from the floor of the truck bed over the tailgate. One or more strap members secure to a lower transverse member of the frame, and each has a bracket member that removably grips the rear lip of the truck bed floor where the tail gate is located. The strap member is tightened to pull the transverse member downward and rearward to hold the wind deflector in place in the truck bed. A spoiler bar can be attached. A tray supported on the frame holds small articles in the space beneath the wind deflector. The wind deflector can be quickly installed and removed.

11 Claims, 3 Drawing Sheets

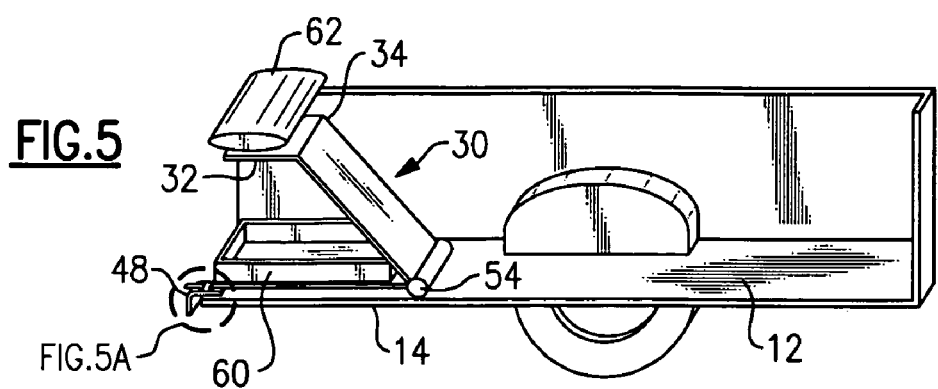
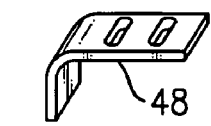
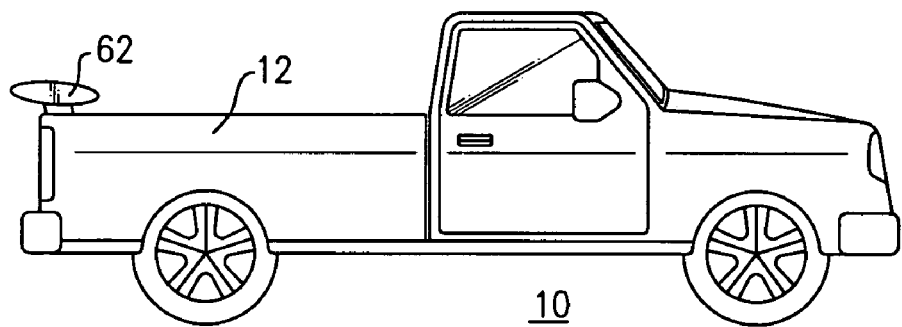
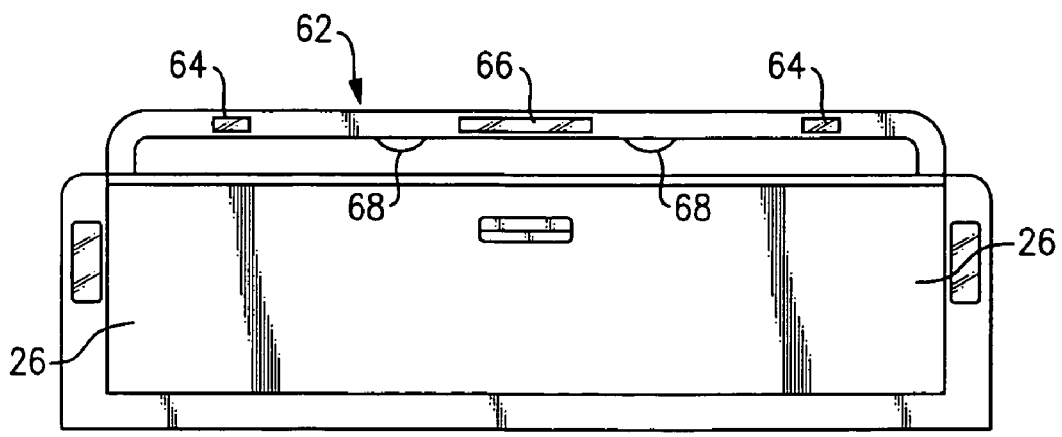

STREAMLINER WIND DEFLECTOR FOR PICKUP TRUCK

BACKGROUND OF THE INVENTION

This invention relates to wind deflectors for the rear part of the open pickup truck bed, and is particularly concerned with air deflectors or wind deflectors that minimize drag occurring in the bed of the pickup truck, and which can increase fuel efficiency in the pickup truck. The invention is also concerned with a wind deflector or streamliner that permits the tailgate to be opened and closed when the wind deflector is in place, and which itself can be easily installed and removed without having to bolt or screw into the bed or floor of the truck.

A number of drag reducers or air deflectors have been proposed in the prior art, but these all have significant drawbacks that have prevented them from being widely adopted.

Kuo U.S. Pat. No. 5,498,058 proposes an air current guide that fits into the rear of the pickup truck bed, and can be used to hold tools, etc., in the space under a main guiding plate. Kuo also proposes the use of panels that move sideways to adjust to the width of the truck bed. But Kuo does not provide for holding the device in place on the truck bed, or keeping it from sliding forward during braking. Also, the entire item is fairly massive, and would be difficult for a person to install and remove.

Felker U.S. Pat. No. 5,743,589, Fonseca U.S. Pat. No. 5,083,829, Larsen U.S. Pat. No. 5,551,747, and Corner U.S. Pat. No. 5,435,616 propose wind deflectors of this general type, which are attached by fasteners to the floor or bed of the truck body. Thus these require a great deal of effort to install and remove.

Others have proposed installing aerodynamic surfaces on top of the truck tail gate, and one example of this is found in Burg. U.S. Pat. No. 5,688,020. This approach ignores the major turbulence created at the right angle formed by the tail gate, and only concentrates on the air flowing over the upper lip of the tail gate.

Thus, to date there has been no truly practical streamliner or air deflector proposed for guiding the air efficiently out of the bed of the pickup truck. As a consequence of this, many operators have taken to driving with the tailgate down to cut down on wind resistance. However, this is an unsafe practice, and can result in damage from rear end collisions, even at low speeds. Also, this approach can only be used when the pickup truck bed is completely empty.

What is lacking, and is the problem that this invention resolves, is structure of holding the air deflector or device in place just ahead of the tail gate, attaching to existing structure in the truck bed and/or side panels, so that it can be both sturdy and light weight, and so that it can be easily removed and stored when the operator needs to place a load into the bed of the truck.

OBJECTS AND SUMMARY OF THE INVENTION

Accordingly, it is an object of this invention to provide a streamliner or wind deflector that is of simple construction, which is easy to install and remove, and which avoids the drawbacks of the prior art.

It is a more specific object to provide a wind deflector that can be installed without the need for bolts or other fasteners that need to be secured to the floor of the truck bed, yet which remains in place and does not slide forward as a result of braking.

It is another feature to provide a wind deflector or streamliner that permits the tailgate to be opened and closed when the wind deflector is in place, so that small items, such as an ice chest, duffel bag, or tool box, can be stored in the space between the wind deflector and the tail gate and accessed when needed.

A further feature is that a "spoiler", that is an aerodynamic horizontal stabilizer member, can be employed above the upper lip of the wind deflector, again without interfering with the ease of installation and removal, and without interfering with the operation of the tail gate.

In accordance with an aspect of this invention, a wind deflector for a truck bed or a pickup truck or a similar vehicle, where the bed is defined by its having a floor, left and right side walls, and a rear tail gate that is hinged at a rearward edge of the floor to swing up to a closed position and swing down to an open position. The wind deflector is formed with a frame that includes left and right side members for removably attaching to structure that is present in the pickup truck on the left and right side walls, respectively. The frame has at least one support member that extends forward and downward from these side members towards the floor of the truck bed, and a lower transverse member at a front end of the support member(s). A rigid wind deflector panel is supported on the frame and this panel extends diagonally up and back from the floor of the truck bed over the top edge of said tail gate. A strap member, or strap members, is (or are) secured to the lower transverse member of the frame, and each strap member has a bracket member thereon that removably grips the rear edge of the truck bed floor, where the tail gate is located. The strap(s) include tensioning means for tightening the strap member and pulling the transverse member downward and rearward to hold the wind deflector in place in the truck bed.

In one embodiment, the left and right side members can take the form of plug members that extend downwards into the stake holes that are provided at top rails of the right and left side walls of many models of truck. In other versions, these side members may attach to other structure beneath the top rails, or may include a clamp that can be fastened to a convenient structural member provided on the side wall of the truck bed.

The space beneath the wind deflector can serve as storage space for tools, coolers, or other items. In order to keep rain and dust out from this storage space, the wind deflector may include a strip of a compressible weather stripping material, e.g., a closed cell foam, extending along a lower edge of the rigid wind deflector panel to seal off space between said lower edge of the panel and the floor of the truck bed. The wind deflector may also include another similar strip of compressible weather stripping material along a lower surface of said panel near its rearward edge, for sealing off space between the top edge of the tail gate and the wind deflector. This will not interfere with opening and closing the tail gate to access the storage area.

In some arrangements of the wind deflector there may be a tray supported on the frame beneath the wind deflector. The tray can be spaced a half-inch above the floor of the truck bed to keep its contents dry and clean. Preferably, the tray can have a peripheral splash wall of two inches in height, more or less.

In a preferred version of the wind deflector, the strap member(s) may be formed of a flexible but substantially non-elastic webbing material, e.g., web belt. The bracket member is in the form of an L-bracket that fits over a rear lip of the floor of the truck bed. The webbing can be snugged tight to hold the frame down.

In some embodiments, a "spoiler" i.e., a transverse airfoil member can be installed on the wind deflector, and would be supported on the frame above said panel and over the top edge of the tailgate. This spoiler or airfoil member includes auxiliary lights coupled to the brake lights and tail lights of the truck, and may also incorporate a downwardly directed space light for illuminating the tail gate when the tail gate is in its lowered position.

The wind deflector is lightweight but durable. The arrangement can be quickly installed and removed, for example, when it is necessary to load the truck bed with materials. The wind deflector can lie flat for storage. The space beneath the wind deflector is easy to access by simply lowering the tail gate, and can be used for transporting small items, tools, or personal items. The auxiliary lights and area lights in the spoiler feature can be plugged into the trailer connector that is usually provided.

Also, while the wind deflector is shown and described here in connection with a pickup truck, the same could be used on any trailer of the type that has side walls and a tail gate.

The above and many other objects, features, and advantages of this invention will become apparent to persons skilled in the art from the ensuing description of a preferred embodiment, which is to be read in conjunction with the accompanying Drawing.

BRIEF DESCRIPTION OF THE DRAWING

FIG. 5 is a view showing a wind deflector of another possible embodiment.

FIG. 5A shows detail of a portion of this embodiment.

FIGS. 6 and 7 are side and rear views of a pickup truck fitted with the wind deflector of this embodiment.

DETAILED DESCRIPTION OF THE PREFERRED EMBODIMENTS

Figure 1:
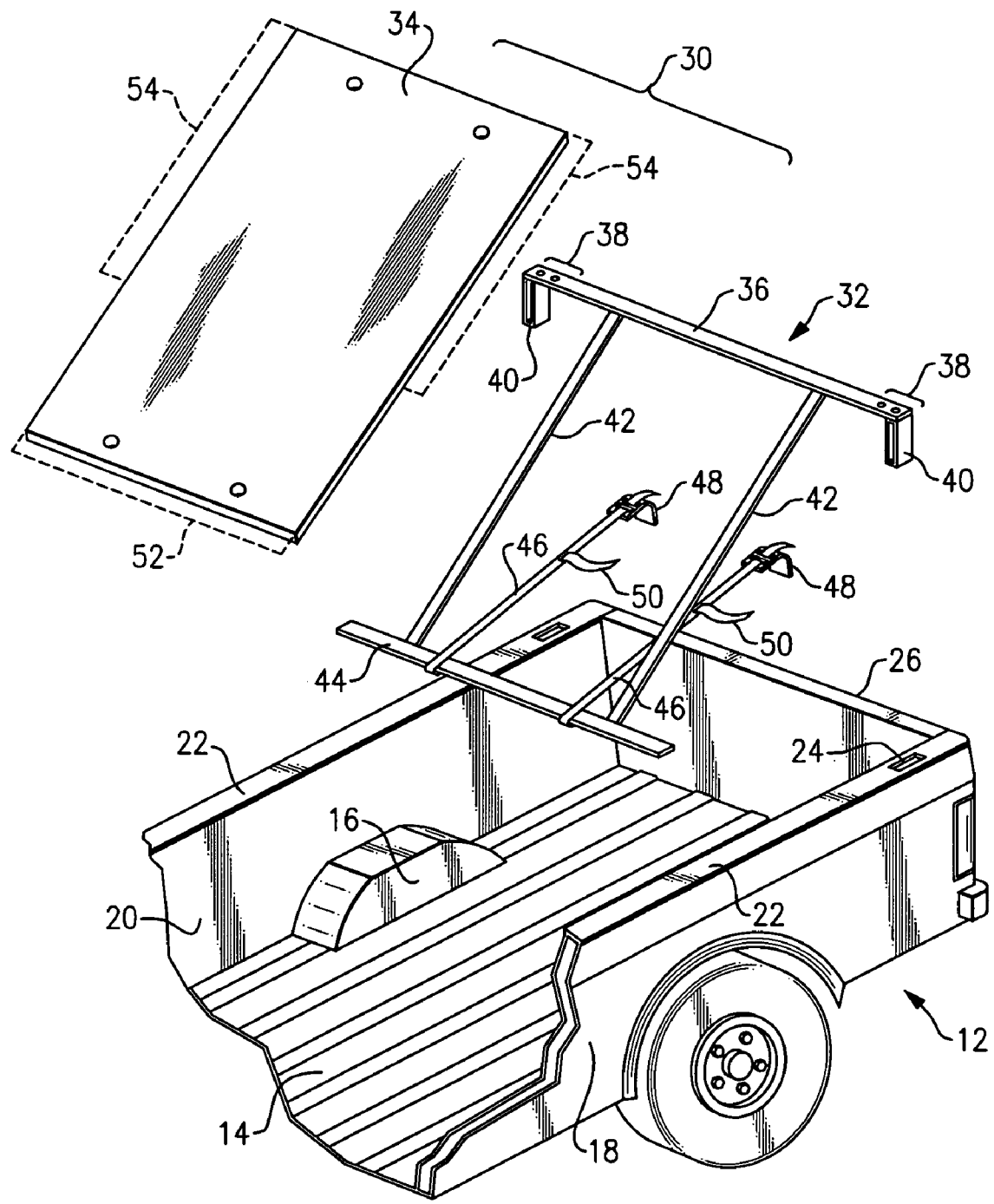
FIG. 1 is a perspective assembly view of a wind deflector arrangement according to one possible embodiment of this invention.

With reference to the Drawing, and initially to FIG. 1, an embodiment of the invention is shown as it is installed in a pickup truck 10, at the rear of the bed 12. The truck bed 12 has a floor 14, with wheel wells 16 for the rear wheels, a left side wall 18 and a right side wall 20. Each side wall has an upper rail 22, and in this model pickup truck the upper rails are provided with rectangular stake holes 24 or pockets, two of which are located just in advance of the location of the truck tail gate 26.

A wind deflector 30 or streamliner according to an embodiment is formed of a support frame 32 onto which is fastened a generally rigid wind deflector panel 34. The support frame 32 has an upper transverse bar 36 that supports the upper or rear portion of the panel 34, and which has side portions 38, 38 that extend to the right and left. In this embodiment, each side portion has a vertical member 40 of rectangular profile, intended as an insert to fit into the rearward stake hole 24 on that side. The frame also has a pair of longitudinal support bars 42, 42 that extend forward and downward, i.e., diagonally towards the floor 14 of the truck bed. A lower transverse support bar 44 is affixed to the lower ends of these longitudinal support bars 42, 42.

The wind deflector panel 34 is fastened to the frame 32 by screws, rivets, or other fastening devices. The panel can be any convenient durable material of suitable stiffness, e.g., polyethylene sheet, and can have additional reinforcements, as needed.

A pair of straps 46 are attached to the support bar 44 and extend rearward. These each have an L-bracket 48 at the distal end that fits over the rear lip or edge of the truck bed, where the tail gate 26 closes. Each L-bracket 48 is a flat member bent into an ell shape, to serve as a hook that removably secures the wind deflector to the rear edge of the truck bed floor. A tightening mechanism 50 is included for each strap, to permit the strap to be drawn tight and rotate the frame downward and secure it against the floor of the truck bed. This also secures the wind deflector assembly from sliding forward when braking the truck. On the other hand, the tension on the straps 46 can be easily relieved when it is desired to take down the wind deflector 30, such as when hauling bulk materials in the truck bed. The entire unit can be laid flat for storage.

As also shown in FIG. 1, a strip of closed-cell foam weatherstripping 52 is affixed onto the under surface of the lower edge of the panel 34. This weatherstripping 52 compresses against the floor 14 of the truck bed to block rain and dust from entering the space beneath the wind deflector. There is also another strip of weatherstripping at the upper or rear edge of the panel 34, but that is not visible in this view. The upper strip seals against the top of the tailgate 26, but does not interfere with opening and closing the tailgate.

Further illustrated here, in broken line, there may be side extensions 54 of the panel 34. These side extensions allow the wind deflector to accommodate truck beds of different widths, and can be pulled out laterally to the extent needed.

Figure 2:
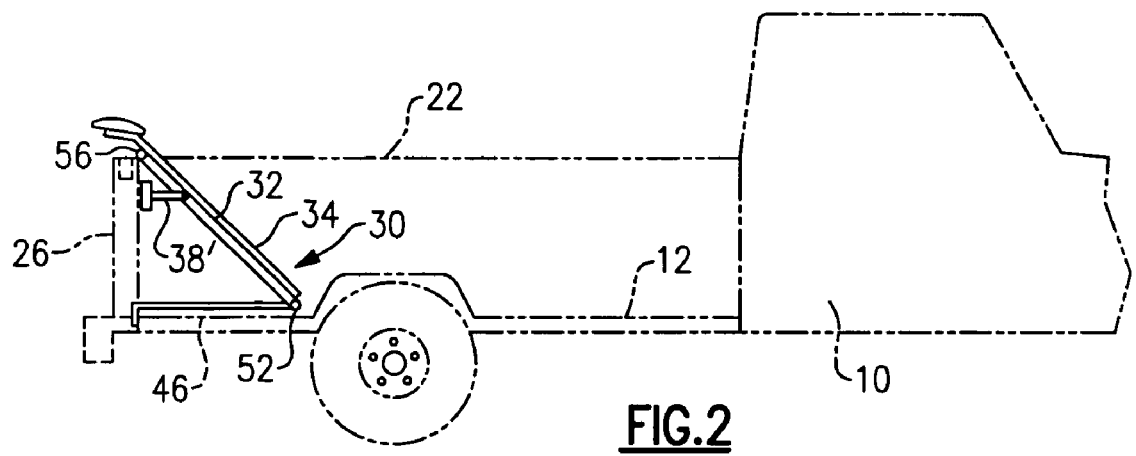
FIG. 2 is side view of another embodiment in place in a bed of a pickup truck.

Another embodiment of the wind deflector is shown in FIG. 2, where elements that are the same as in the first embodiment are identified with similar reference numbers, and need not be described again in detail. Here, the frame 32 has side members 38' that are situated below the truck side rails 22, and these attach to structure provided in the particular model of truck in the side walls beneath the top rails. It is usually not necessary to drill any holes or penetrations for this, as most models of truck have structural elements on the side walls that can be used to clamp the frame 32 in place. The strap(s) 46 and associated L-clamp(s) are employed on the rear lip of the truck bed floor, as previously discussed.

In the FIG. 2 embodiment, the lower strip 52 of weatherstripping is shown, as is an upper strip 56 that compresses against the top of the tailgate 26 when the latter is raised or closed. The lower strip 52 can leave a small gap or channel to let rainwater drain out below the tail gate 26.

Figure 3:
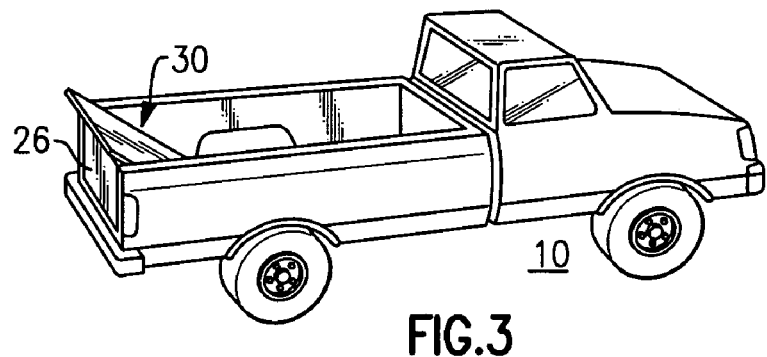
FIGS. 3 and 4 are perspective views of a pickup truck fitted with a wind deflector according to one embodiment, showing the tailgate in raised and lowered positions, respectively.
Figure 4:
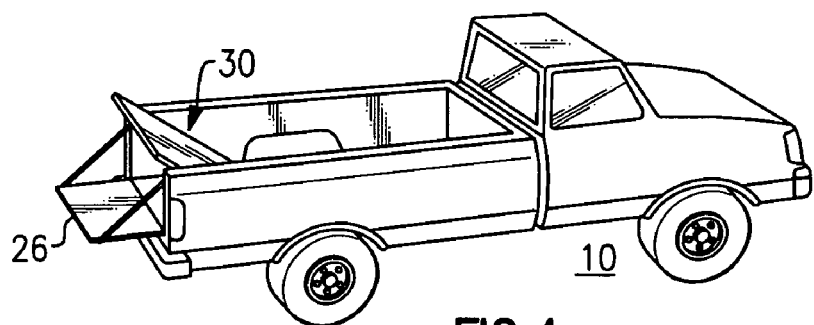

With the wind deflector 30 of this invention installed on the truck 10, as shown in FIG. 3, the upper or rear edge of the panel extends a few inches behind the plane of the tail gate 26. This diverts air currents behind the tail gate to prevent dust and rain from reaching the zone where the tail gate meets the wind deflector, keeping that area relatively clean. As shown in FIG. 4, the tailgate 26 can be dropped open to access the space beneath the wind deflector 30. This wind deflector 30 creates a convenient space for storage of tools, personal items, food, or other articles, where they will be kept clean and out of the elements, and where the items can be accessed by opening the tailgate.

A further embodiment of the wind deflector of this invention is shown in FIGS. 5, 6, and 7. Elements described previously in respect to the other embodiments are identified with similar reference numbers. Here, the wind deflector 30 is comprised of a frame 32 and panel 34, as describe previously, except that in this embodiment the frame and panel have an upper portion that bends to a level orientation from the diagonal, and then passes straight over the top edge of the tailgate. The wind deflector is secured by strap(s) and L-bracket(s) 48, one L-bracket being shown in FIG. 5A. One leg of the L-bracket 48 fits over the lip of the truck bed floor 14. IN some embodiments, there may be an adjustable leg that swings down instead of the strap 46.

This embodiment includes a tray 60 that fits onto the frame in the space beneath the wind deflector, and can be used for containing tools, small articles, clothing, food, personal gear, etc. The tray 60 has a splash wall on its periphery that is (nominally) two inches high, and the tray 60 rests a short distance, e.g., one-half inch, above the floor 14 of the truck bed. This helps keep the tray contents dry and away from dust and fumes.

Also shown in this embodiment is a "spoiler" bar 62, i.e., a transverse bar with aerodynamic surfaces, to improve handling of the truck at highway speeds. The spoiler bar is supported on struts or vertical members on the frame 32 above the top of the wind deflector panel 34. This is shown at the side in FIG. 6 and at the rear in FIG. 7. The rear surface of this spoiler bar 62 is provided with auxiliary reverse or back-up lights 64 and a center brake light 66. Turn signals lights and running lights can be included also, if desired. Wiring for these lamps can extend within the spoiler bar and frame, and extend to a connector of the type commonly used for connecting wiring harnesses for trailers or the like.

On its lower surface, the spoiler bar 62 also includes downwardly directed area lights 68, which shine down onto the tailgate 26 when it is lowered to its open position. There can be a manual switch for these lights 68, or the the lights 68 can switch on automatically when the tailgate is dropped.

As mentioned before, the wind deflector can be used with trucks or with other vehicles, including trailers, where it is desired to reduce the drag when the vehicle is not carrying a load in the vicinity of its tailgate.

Many other modifications and variations are possible which would not depart from the scope and spirit of this invention, as defined in the appended claims.

I claim:

1. Wind deflector for a truck bed of the type having a floor, left and right side walls, and a rear tail gate that is hinged at a rearward edge of said floor; comprising:
    a frame that includes left and right side members for removably attaching to structure on the left and right side walls, respectively; at least one support member extending forward and downward from said side members towards the floor of the truck bed; and a lower transverse member at a front end of the at least one support member;
    a rigid wind deflector panel mounted on said frame and extending diagonally back from the floor of said truck bed over a top edge of said tail gate; and
    at least one strap member secured to said lower transverse member and having a bracket member thereon that removably grips the rear edge of the truck bed floor, the strap including tensioning means for tightening the strap member and pulling the transverse member downward and rearward to hold the wind deflector in place in said truck bed.

2. The wind deflector according to claim 1 wherein said left and right side members include plug members that extend downwards into stake holes at top rails of the right and left side walls, respectively.

3. The wind deflector according to claim 1 comprising a strip of a compressible weather stripping material extending along a lower edge of the rigid wind deflector panel to seal off space between said lower edge and the floor of the truck bed.

4. The wind deflector according to claim 1 comprising a strip of a compressible weather stripping material extending along a lower surface of said panel near the rearward edge thereof for sealing off space between the top edge of the tail gate and said wind deflector.

5. The wind deflector according to claim 1 wherein said at least one strap member is formed of a flexible but substantially non-elastic webbing material.

6. The wind deflector according to claim 1 wherein said bracket member is an L-bracket that fits over a rear lip of the floor of the truck bed.

7. The wind deflector according to claim 1 comprising a transverse airfoil member supported on said frame above said panel and over the top edge of said tailgate.

8. The wind deflector according to claim 7 wherein said airfoil member includes auxiliary lights coupled to brake lights and tail lights of the truck.

9. The wind deflector according to claim 7 wherein said airfoil member includes a downwardly directed space light for illuminating the tail gate when the tail gate is in a lowered position.

10. The wind deflector according to claim 1 comprising a tray supported on said frame beneath the wind deflector and spaced above the floor of the truck bed.

11. The wind deflector according to claim 10 wherein said tray has a peripheral splash wall of about two inches in height.

* * * * *